United States Patent
Casati et al.

(10) Patent No.: US 7,593,362 B1
(45) Date of Patent: Sep. 22, 2009

(54) MOBILE IP DEPLOYMENT

(75) Inventors: Alessio Casati, Wooton Bassett (GB);
Sudeep Kumar Palat, Grange Park (GB); Hatef Yamini, London (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 10/009,019

(22) PCT Filed: Apr. 18, 2000

(86) PCT No.: PCT/GB00/01486

§ 371 (c)(1), (2), (4) Date: Mar. 2, 2005

(87) PCT Pub. No.: WO00/76170

PCT Pub. Date: Dec. 14, 2000

(30) Foreign Application Priority Data

Jun. 8, 1999 (GB) .................................... 9913334

(51) Int. Cl.
*H04W 4/00* (2009.01)
(52) U.S. Cl. .................................. 370/328
(58) Field of Classification Search .................. 370/328
See application file for complete search history.

(56) References Cited

U.S. PATENT DOCUMENTS

| | | | | |
|---|---|---|---|---|
| 6,137,791 | A * | 10/2000 | Frid et al. | 370/352 |
| 6,438,370 | B1 * | 8/2002 | Einola et al. | 455/422.1 |
| 6,711,147 | B1 * | 3/2004 | Barnes et al. | 370/338 |

FOREIGN PATENT DOCUMENTS

| | | |
|---|---|---|
| EP | 0883 266 A2 | 9/1998 |
| EP | 0 918 417 | 5/1999 |

OTHER PUBLICATIONS

Yuh-Rong Leu et al. "Implementation Considerations for Mobile IP". IEEE 1997 (no month available), pp. 478-481.*
XP-002123919 IP Mobility Support by C. Perkins Oct. 1996.
Charles, E. Perkins, "Mobile IP: Design Principles And Practices", Computing & Engineering Publishing Group, ISBN: 0-201-63469-4, pp. 47-49, 1998.

* cited by examiner

*Primary Examiner*—Vincent P Harper
*Assistant Examiner*—Marivelisse Santiago-Cordero

(57) ABSTRACT

In the GPRS when a MS moves from a former routing area to a new routing area, a method of supporting mobile Internet protocol characterized in that on receipt of a routing area update message from the MS, a mobile Internet protocol agent advertisement is sent only to that MS. The move may be inter-SGN or intra-SGN or may involve a change of RNC. The method allows efficient use of radio resources.

7 Claims, 4 Drawing Sheets

MOBILE IP DEPLOYMENT

BACKGROUND OF THE INVENTION

1. Field of the Invention

This invention relates to the use of mobile Internet Protocol in the Universal Mobile Telephone System (UMTS) and the General Packet Radio System (GPRS), and relates in particular to the support of intra-PLMN (Public Land Mobile Network) user mobility by means of Mobile Internet Protocol.

2. Description of the Prior Art

With the rapidly growing use of Internet Protocol (IP), an effective method of supporting mobility in UMTS and GPRS by use of protocols developed by the Internet Engineering Task Force (IETF) is highly desirable.

At present, when a Mobile System (MS) moves within the PLMN, its mobility is supported by movement detection algorithms defined in RFC2002 (Request For Comments 2002). These algorithms entail the reception of mobile IP Foreign Agent (FA) advertisements (i.e. messages sent by a mobile to a set of network nodes to indicate that the mobile is attached to that network). To save radio resources, it is not advisable to send such advertisements periodically to each MS. On the other hand, there is no shared channel available to transmit the advertisements to all the MSs.

SUMMARY OF THE INVENTION

It is an object of the invention to provide a method and apparatus by which advertisements can be sent to a MS efficiently, and with minimum handover latency.

In current telecommunications networks, packet mobility is defined for GPRS in TS (Telecommunication Standard) GSM03.60. Internet Protocol mobility support is defined in RFC2002 for IETF.

A paper by C. Perkins entitled "RFC 2002: IP Mobility Support' IETF RFC—Request for Comments, October 1996 (1996-10), XPOO2123919 is referred to as background.

It is known from a European patent application EP-A-0918417 to provide a method of supporting mobile Internet protocol in a packet radio system upon a mobile system moving from a former routing area to a new routing area and sending to a controlling support node a routing area update message, in which on receipt of said routing area update message, a mobile Internet protocol agent advertisement is sent from a controlling support node only to said mobile system.

The present invention is characterised over the disclosure of EP-A-0918417 in that the radio system is a General Packet Radio System (GPRS) and the or each controlling support node(s) is a Serving GPRS Support Node (SGSN).

BRIEF DESCRIPTION OF THE DRAWINGS

The invention will be described by way of example only with reference to the accompanying drawings in which.

DETAILED DESCRIPTION OF THE INVENTION

Figure 1:
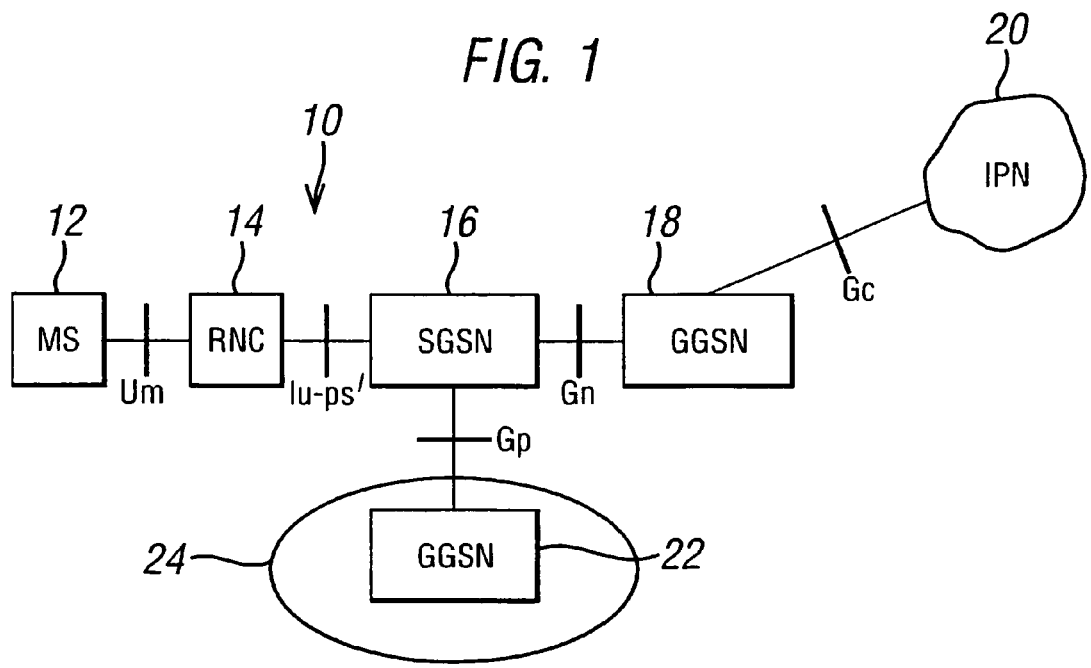
FIG. 1 illustrates schematically the GPRS.

In FIG. 1, a mobile system (MS) 12 in the GPRS 10 is connected across a radio interface Um to a Radio Network Controller 14 which is connected through a Serving GPRS Support Node (SGSN) 16 and a Gateway GPRS Support Node (GGSN) 18 to the Internet 20. The MT 12, RNC 14 and GSNs 16 and 18 represent a public Land Mobile Network, and the SGSN 16 may be connected to a GGSN 22 of another PLMN 24.

Figure 2:
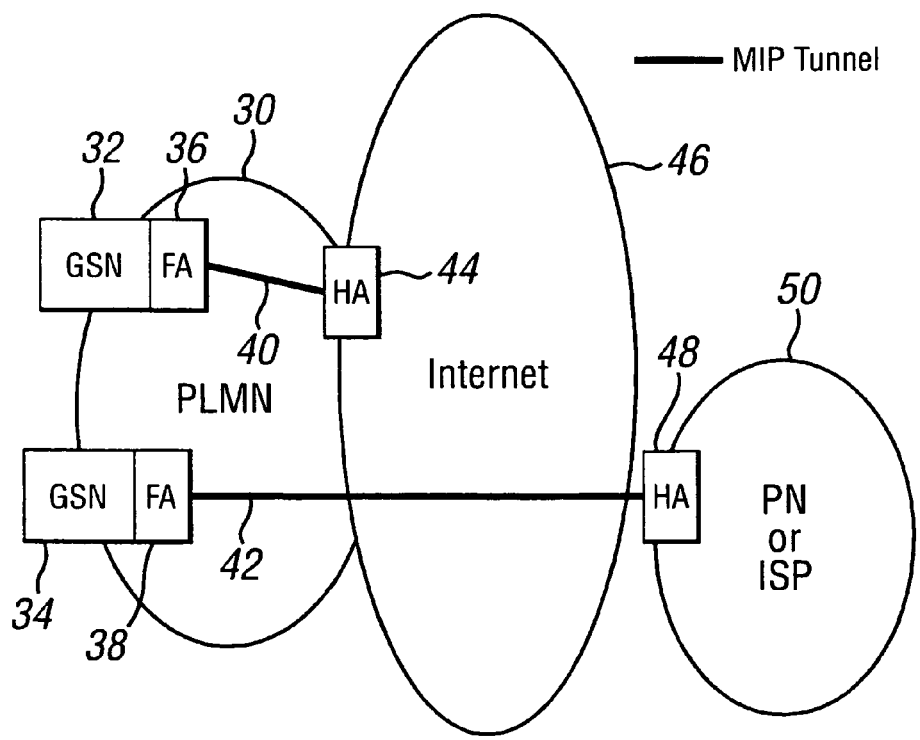
FIG. 2 illustrates a deployment scenario which can be implemented by application of the invention.

FIG. 2 shows a desired scenario for mobile IP deployment in UMTS/GPRS. A PLMN backbone 30 has two GPRS Support Nodes 32, 34 each providing a Foreign Agent (FA) 36, 38 for Internet access through MIP tunnels 40, 42. The first MIP tunnel 40 passes to a Home Agent (HA) 44 of the Internet 46, i.e. the tunnel gives direct access to the Internet. The second tunnel 42 passes to an HA 48 of a private network or home Internet Service Provider (ISP) 50, i.e. it gives remote network access.

Application of the invention permits this advanced scenario of MIP deployment to be implemented, without changing TS GSM04.08 and TS UMTS 24.008 and with minimum changes in existing GPRS standards.

TS GSM04.08 describes, among other aspects, the GPRS mobility management. Similarly, TS UMTS 24.008 describes the UMTS mobility management. When a MS moves from one RA to another RA, the MS performs a RA update procedure as part of mobility management. This protocol is used between the MS 12 and the SGSN 16.

The session activation and initial registration are completely identical to the case in which the FA is placed at a GGSN (referenceTdocs2m99036). For implementation of the invention, it is assumed that every ISGN is equipped with an FA. The Internet GSN may be a Serving GSN which behaves in a different way when the Access Point Node (?) (APN) specified in the Packet Data Protocol (PDP) context activation request or in the subscription data selects mobile IP mode of operation. Instead of sending a PDP context activation request to the GGSN, the IGSN sends a PDP context Creation Response to the mobile terminal and triggers a FA to send the advertisement to the mobile which is requesting the activation of a session, in the same way as is done when the FA is at the GGSN.

The difference with respect to the case where the FA is at a GGSN non-co-located with the SGSN is in that inter-ISGN mobility is handled by mobile IP, with the optional support of existing SGSN specific functionality in order to transfer packets from one IGSN to another when handover occurs.

In a description below in which RA update procedures are described, the approach is chosen to highlight the differences with respect to current specifications, in particular with GSM TS03.60.

The reception at the SGSN 16 of a RA update message can be used to trigger a MIP agent advertisement on the traffic channels to the MS performing the RA update. In this way, existing MIP movement detection algorithms can be used to detect the change of FA.

A change of FA may be associated with entering a new RA. A new RA may, or may not, be under the coverage of different FA. RAs associated to different SGSNs are necessarily associated with different FAs. RAs belonging to the same SGSN may be associated with different FAs, depending on the choice of the network operator.

Figure 3:
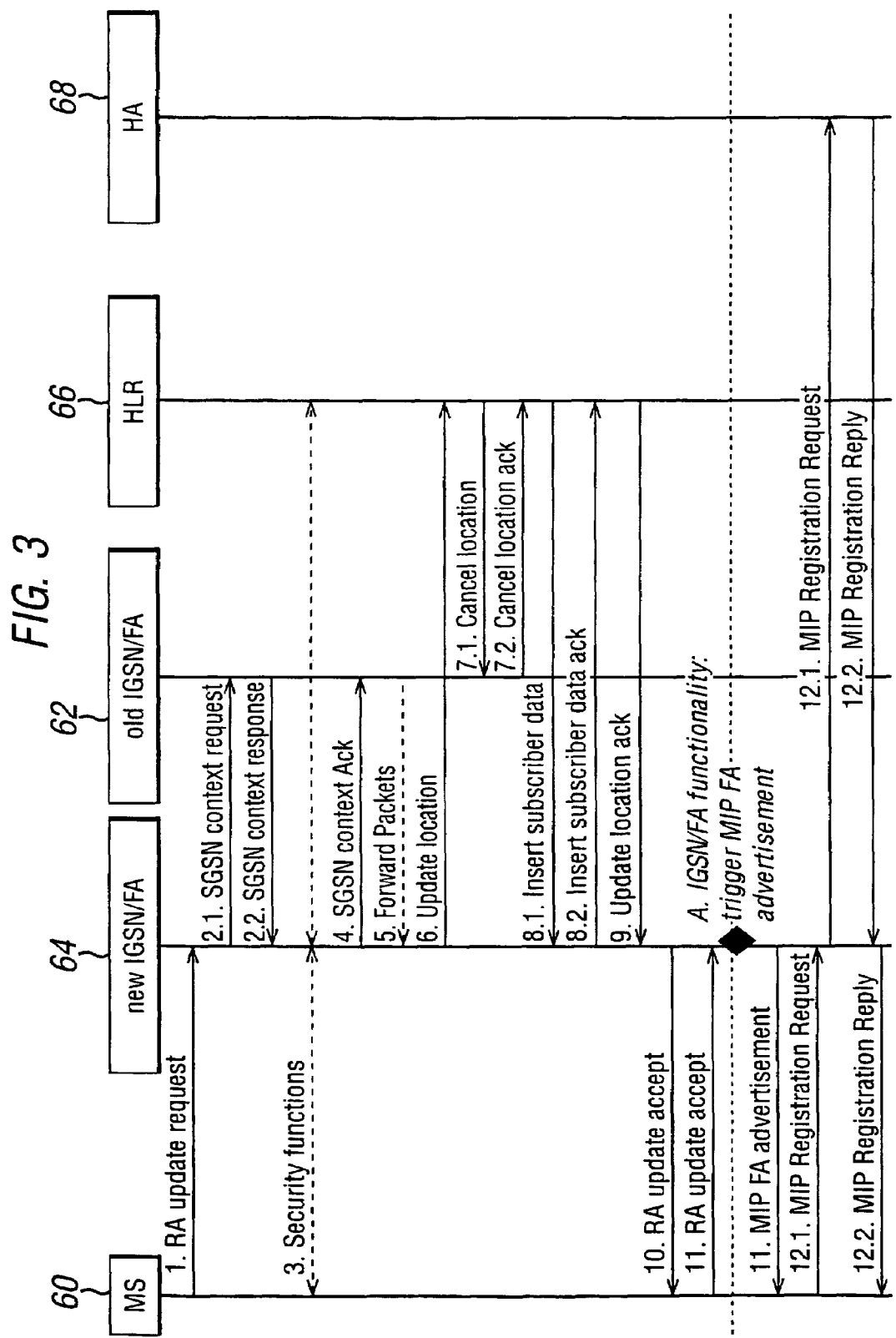
FIG. 3 illustrates exchange of messages between various parts of the UMTS during an inter-Internet GPRS support node routing area update.

Referring now to FIG. 3, suppose an MS 60 moves so as to change from the area of an old Internet GSN 62 to the area of a new Internet GSN 64. The Home Location Register (HLR) 66 and Home Agent 68 of the MS 60 are also involved in the messaging shown in the Figure.

Step 1

The MS 60 sends a routing area update request (the old Routing Area Identity (RAI)) old Packet Temporary Mobile Subscriber Identity (P-TMSI) Signature, Update Type to the new SGSN 62. The Update Type indicates whether the RA update is periodic or not: periodic updates happen at regular intervals, the non periodic at RA boundary crossing) or a periodic RA update. The Base Station System (BSS) associated with the old SGSN 62 adds the Cell Global Identity including the Routing Area Code (RAC) and the Location Area Code (LAC) of the cell from which the message was received before passing the message to the new SGSN 64.

Step 2

The new SGSN 64 sends an SGSN Context Request (the old RAI, the Temporary Link Layer Identity (TLLI), the old P-TMSI Signature, the new SGSN Address) to the old SGSN 62 to get the Mobility Management (MM) and the Packet Data Protocol (PDP) contexts for the MS 60. The old SGSN 62 validates the old P-TMSI signature and responds with an appropriate error cause if it does not match the value stored in the old SGSN 62. This initiates a security function in the new SGSN 64. If the security functions authenticate the MS 69 correctly, the new SGSN 64 will send an SGSN Context Request (old RAI, TLLI, MS Validated, new SGSN address) message to the old SGSN 62. The MS Validated inclusion indicates that the new SGSN 64 has authenticated the MS 60. If the old P-TMSI signature was valid or if the new SGSN 64 indicates that it has authenticated the MS 60, the old SGSN 62 responds with SGSN Context Response (MM context, PDP contexts, Logical Link layer (LLC) Ack). If the MS 60 is not known in the old SGSN 62, the old SGSN responds with an appropriate error cause. The old SGSN stores the new SGSN address, to allow the old SGSN to forward data packets to the new SGSN. LLC Ack contains the acknowledgements for each LLC connection used by the MS 60. Each PDP context includes the GPRS Tunneling Protocol (GTP) sequence number for the next downlink Network layer Protocol Data Unit (N-PDU) to be sent to the MS 60 and the GTP sequence number for the next uplink N-PDU to be tunneled via a mobile IP tunnel to the HA; referring again to FIG. 2, the mobile IP tunnel can be either tunnel 40 or tunnel 42. The old SGSN 62 starts a timer and stops the transmission of N-PDUs to the MS 60.

Step 3

Security functions may be executed. These procedures are standard. Ciphering mode is set if ciphering is supported.

Step 4

The new SGSN 64 sends an SGSN Context Acknowledgement message to the old SGSN 62. This informs the old SGSN that the new SGSN is ready to receive data packets belonging to the activated PDP contexts. The old SGSN 62 marks in its context that the Mobile Switching Centre (MSC) Visitor Location Register (VLR) association and the information in the HLR are involved. This triggers the MSC/VLR and the HLR to be dated if the MS 60 initiates a routing area update procedure back to the old SGSN 62 before completing the ongoing routing area update procedure. If the security functions do not authenticate the MS 60 correctly, then the routing area update is rejected and the new SGSN 64 sends a reject indication to the old SGSN 62. The old SGSN 62 continues as if the SGSN context request was never received.

Step 5

The old SGSN 62 duplicates the buffered N-PDUs and starts tunneling them to the new SGSN 64. Additional N-PDUs received before the timer described in step 2 expires are also duplicated and tunneled to the new SGSN. N-PDUs that were already sent to the MS 60 and that are not yet acknowledged by the MS are tunneled together with the number of the LLC frame that transferred the last segment of the N-PDU. No N-PDUs shall be forwarded to the new SGSN after expiry of the timer described in step 2.

Step 6

The new SGSN 64 informs the HLR 66 of the change of SGSN by sending Update Location (SGSN Number, SGSN Address, IMSI) to the HLR.

Step 7

The HLR 66 sends Cancel Location (IMSI, Cancellation Type) to the old SGSN 62 with Cancellation Type set to Update Procedure. If the timer described in step 2 is not running, then the old SGSN removes the MM and PDP contexts. Otherwise, the contexts are removed only when the timer expires. This allows the old SGSN to complete the forwarding of N-PDUs. It also ensures that the MM and PDP contexts are kept in the old SGSN in case the MS 60 initiates another inter SGSN routing area update before completing the ongoing routing area update to the new SGSN. The old SGSN acknowledges with Cancel Location Ack (IMSI).

Step 8

The HLR 66 sends Insert Subscriber Data (IMSI, GPRS subscription data) to the new SGSN 64. The new SGSN validates the MS's presence in the (new) RA. If due to regional subscription the MS is rejected, the new SGSN 64 rejects the Routing Area Update Request with an appropriate cause and returns an Insert Subscriber Data Ack (IMSI, SGSN Area Restricted Due To Regional Subscription) message to the HLR 66. If all checks are successful then the SGSN constructs an MM context for the MS and returns an Insert Subscriber Data Ack (IMSI) message to the HLR.

Step 9

The HLR 66 acknowledges the Update Location by sending Update Location Ack (IMSI) to the new SGSN 64.

Step 10

The new SGSN 64 validates the MS's presence in the new RA. If due to regional, national or international restrictions the MS is not allowed to attach in the RA or subscription checking fails, then the new SGSN rejects the routing area update with an appropriate cause. If all checks are successful then the new SGSN constructs MM and PDP contexts for the MS. A logical link is established between the new SGSN and the MS. The new SGSN responds to the MS with Routing Area Update Accept (P-TMSI, LLC Ack, P-TMSI Signature). LLC Ack contains the acknowledgements for each LLC connection used by the MS, thereby confirming all mobile-originated N-PDUs successfully transferred before the start of the update procedure.

Step 11

The MS 60 acknowledges the new P-TMSI with a Routing Area Update Complete (P-TMSI, LLC Ack). LLC Ack contains the acknowledgements for each LLC connection used by the MS, thereby confirming all mobile-terminated N-PDUs successfully transferred before the start of the update procedure. If LLC Ack confirms reception of N-PDUs that were forwarded from the old SGSN, then these N-PDUs shall be discarded by the new SGSN. LLC and SNDCP in the MS are reset locally.

Step 12

Over the newly setup link to the mobile, a Mobile IP Agent Advertisement is sent including challenge/response and NAI extensions. This is triggered in any convenient way and is implementation dependent. The Advertisement is sent only to the mobile performing the RA update (i.e. MS 60). It is sent in such a way that subnet prefix based movement detection algorithm which the Mobile IP spec [RFC2002] suggests triggers an immediate mobile IP registration (i.e. by making sure no two FA in the PLMN send advertisements with identical subnet prefixes).

Step 13

The normal MIP registration is performed. This will be periodically repeated according to timers negotiated in the registration, in order to keep the MIP session alive. In the case of a rejected routing area update operation, due to Routing Area restrictions, the new SGSN does not construct an MM context. A reject is returned to the MS 60 with an appropriate cause. The MS does not re-attempt a routing area update to that RA. The RAI value is deleted when the MS is powered-up. If the timer described in step 2 expires and no Cancel Location (IMSI) was received from the HLR, then the old SGSN shall stop forwarding N-PDUs to the new SGSN. If the routing area update procedure fails a maximum allowable number of times, or if the SGSN returns a Routing Area Update Reject (Cause) message, the MS is caused to enter IDLE state.

Figure 4:
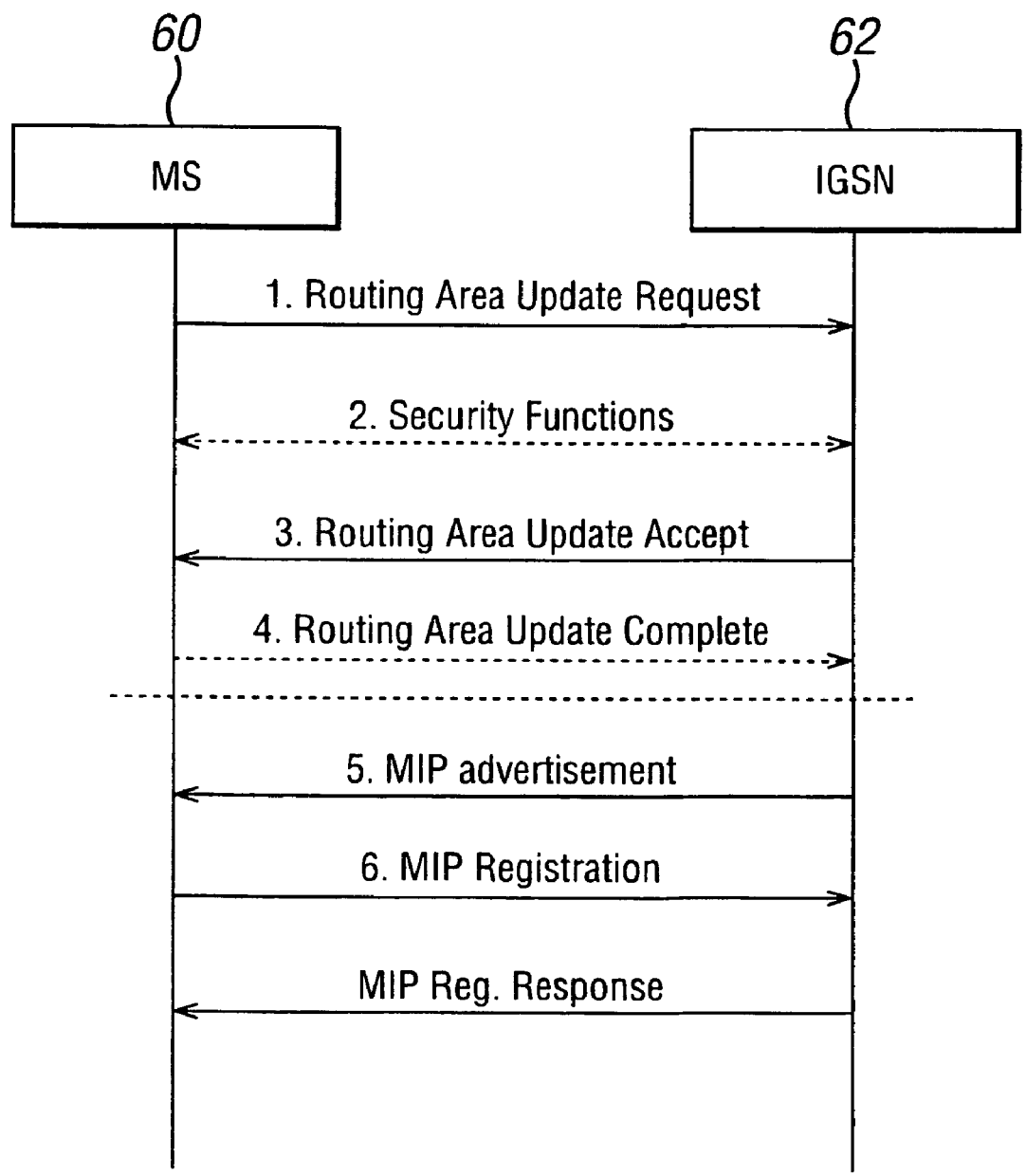
FIG. 4 illustrates exchange of messages during an intra-Internet GPRS Support Node Routing Area update.

FIG. 4 illustrates the simpler messaging which is appropriate when an Intra-IGSN Routing Area Update is performed.

Step 1

The MS 60 sends a Routing Area Update Request (old RAI, old P-TMSI Signature, Update Type) to the SGSN 62. Update Type indicates RA update. The BSS associated with SGSN 62 adds the Cell Global Identity including the RAC and LAC of the cell where the message was received before passing the message to the SGSN, see GSM08.18.

Step 2

Security functions may be executed. These procedures are standard.

Step 3

The SGSN 62 validates the MS's presence in the new RA. If due to regional, national or international restrictions the MS is not allowed to attach in the RA or subscription checking fails, then the SGSN rejects the routine area update with an appropriate cause. If all checks are successful then the SGSN updates the MM context for the MS. A new P-TMSI may be allocated. A Routing Area Update Accept (P-TMSI, P-TMSI Signature) is returned to the MS 60.

Step 4

If P-TMSI was reallocated, the MS acknowledges the new P-TMSI with Routing Area Update Complete (P-TMSI).

Step 5

If the New routing area is under the domain of a new FA (e.g. for load sharing reasons) then a Mobile IP Agent Advertisement is sent including challenge/response and NAI extensions. This is triggered in any convenient way and is implementation dependent. It is sent only to the mobile performing the RA update (i.e. MS 60). It is sent in such a way that subnet prefix based movement detection algorithm the Mobile IP spec [RFC2002] suggests trigger an immediate mobile IP registration (i.e. by making sure no two FA in the PLMN send advertisements with identical subnet prefixes).

Step 6

The regular MIP registration is performed. This will be periodically repeated according to timers negotiated in the registration in order to keep the MIP session alive.

If the routing area update procedure fails a maximum allowable number of times, or if the SGSN returns a Routing Area Update Reject (Cause) message, the MS 60 enters IDLE state.

The lifetime of the MIP registration should be set to a value>> periodic RA updates interval (Timer T3312) so that the necessity to send MIP Registration does not arise more frequently than Periodic RA updates.

The lifetime of a MIP advertisement should be set to a value>>T3312 as well, so that attempts to register are not more frequent than Periodic RA updates (a short Advertisement lifetime may require sending many advertisements over the air, or, missing this, it may trigger the mobile to re-register frequently, since the lifetime based movement detection algorithm may be triggered). Periodic RA updates should not trigger MIP registrations.

Consider now a Serving Radio Network Subsystem (SRNS) relocates the UMTS. When the mobile is in idle mode, the procedures defined for GPRS work the same way in UMTS. When the mobile is in connected state, the SRNS relocation procedure illustrated in FIG. 5 takes place. When the word "SGSN" is used, it is used to indicate a functionality and not a physical node.

Step 1

UTRAN (reference 14 in FIG. 1) makes the decision to perform the Serving RNC relocation procedure. This includes decision on into which RNC (Target RNC 74) the Serving RNC functionality is to be relocated. The source SRNC 72 sends SRNC Relocation required messages to the SGSN 76. This message includes parameters such as target RNC identifier and an information field that is passed transparently to the target RNC.

Step 2

Upon reception of SRNC Relocation required message the SGSN 76 determines from the received information that the SRNC relocation will (in this example) result in change of SGSN. The SGSN will then send a Forward SRNC relocation request to the applicable SGSN, SGSN 78 including the information received from the Source RNC 72 and necessary information for the change of SGSN (e.g. MM context, PDP context).

Step 3

The SGSN 78 will send a SRNC Relocation Request message to the target RNC 74. The message includes information for building up the SRNC context, transparently sent from Source RNC 72 (e.g. UE id., no of connected CN nodes, UE capability information) and directives for setting up Iu user plane transport bearers. When the Iu user plane transport bearers have been established, and target RNC completed its preparation phase, SRNC Relocation Proceeding 1 message is sent to the SGSN 78.

Step 4

When the traffic resources between target RNC 74 and SGSN 78 has been allocated and the SGSN78 is ready for the SRNC move, then the Forward SRNC Relocation Response is sent from SGSN78 to SGSN76. This message indicates that necessary resources have been allocated for the SRNC relocation.

Step 5

When the Forward SRNC Relocation Response has been received in the SGSN76, the SGSN76 indicates the completion of preparation phase at the CN side for the SRNC relocation by sending the SRNC Relocation Proceeding 2 message to the Source RNC72.

Step 6

When the source RNC 72 has received the SRNC Relocation Proceeding 2 message, the source RNC sends a SRNC Relocation Commit message to the target RNC 74. The target RNC executes switch for all bearers at the earliest suitable time instance.

Step 7

Immediately after a successful switch at RNC, target RNC (=SRNC) sends SRNC Relocation Complete message to the SGSN 78. The SGSN will also send a Complete SRNC Relocation towards the SGSN 76.

Step 8

At reception of the Complete SRNC Relocation, SGSN 76 will send a release indication towards the Source RNC. This will imply release of all UTRAN resources that were related to this UE.

Mip 1: Over the newly setup link to the mobile (the target RNS is now acting as SRNS) a Mobile IP Agent Advertisement is sent including challenge/response and NAI extensions. This is triggered in any convenient way and is implementation dependent. It is sent only to the mobile performing the SRNS relocation (i.e. MS 70). It is sent in such a way that subnet prefix based movement detection algorithm the Mobile IP spec [RFC2002] suggest triggers an immediate mobile IP registration (i.e. by making sure no two FA in the PLMN send advertisements with identical subnet prefixes).

When the target RNC is acting as Mip 2: the normal MIP registration is performed. This will be periodically repeated according to timers negotiated in the registration, in order to keep the MIP session alive.

Step 9

SRNC sends New MM System Information to the UE indicating e.g. relevant Routing Area and Location Area. Additional RRC information may then also be sent to the UE, e.g. new RNTI identity.

Step 10

The SGSN 78 informs the HLR 80 of the change of SGSN by sending Update GPRS location (IMSI, new SGSN address etc) to the HLR. The HLR cancels the context in the old SGSN, SGSN 76, by sending Cancel Location (IMSI). The SGSN1 76 removes the context and acknowledges with Cancel Location Ack. The HLR 80 sends Insert subscriber data (IMSI, subscription data) to the SGSN 78. The SGSN 78 acknowledges with Insert Subscriber Data Ack. The HLR acknowledges the Update GPRS location by sending Update GPRS Location Ack to the SGSN 78.

Step 11

At reception of Insert subscriber data from HLR 80 the SGSN 78 will initiate the update of MM information stored in the MS 70. This done by sending Network Initiated Routing Area Update Command to the MS 70. This message will include new RAI:, and possible also new P-TMSI. When the MS70 has made necessary updates it answers with Network Initiated Routing Area Update Complete.

Figure 5:
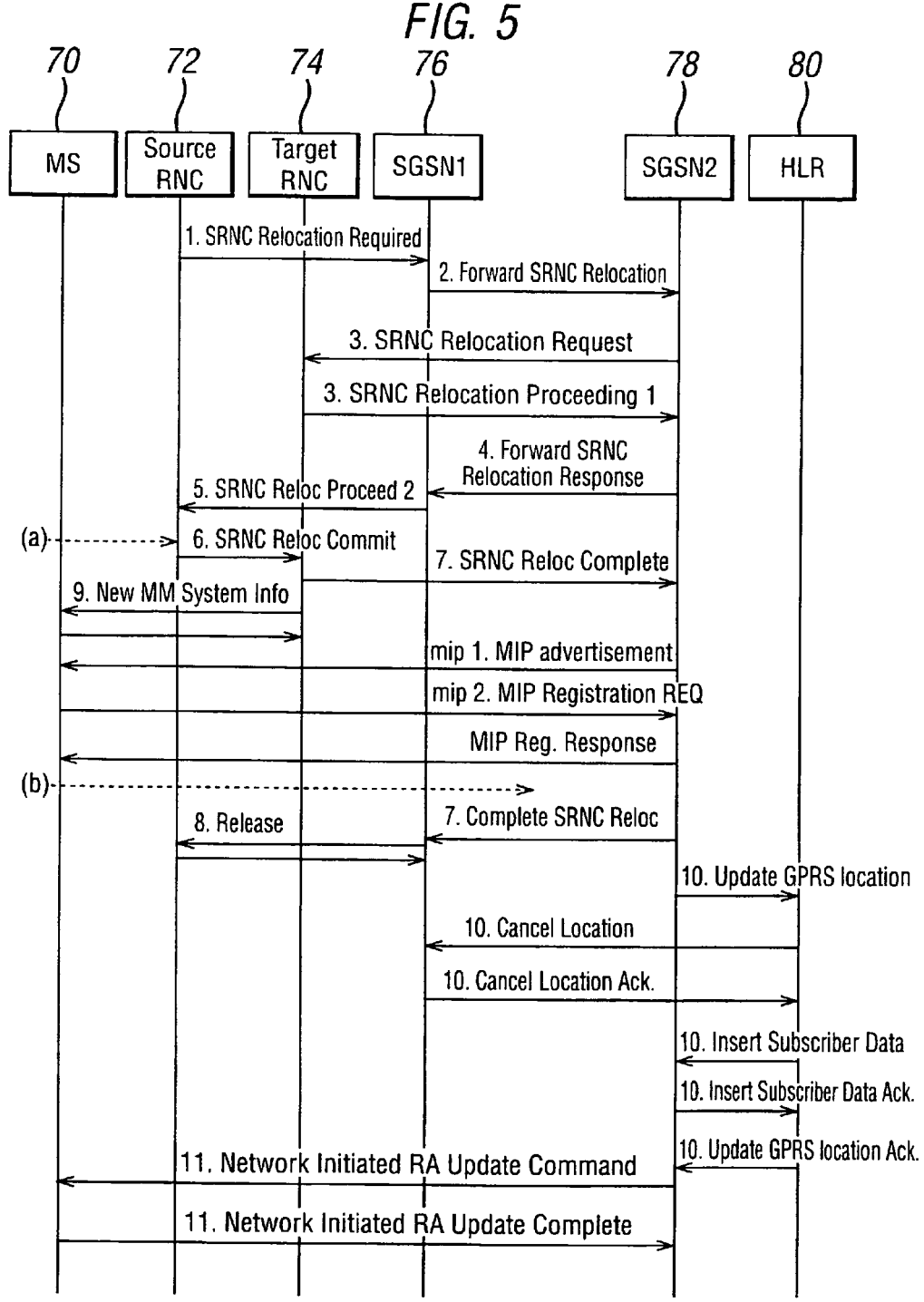
FIG. 5 illustrates the exchange of messages during a serving radio network subsystem relocation.

Of the three procedures described with reference to FIGS. 3, 4 and 5, any procedure can be applied to either of the MIP tunnels 40, 42 in FIG. 2.

Implementation of the invention allows efficient use of radio resources, and provides optimal handover performance.

The invention claimed is:

1. A method of supporting mobile internet protocol when a mobile system moves from a former routing area to a new routing area and sends to a controlling support node a routing area update message, comprising the steps of:
   the controlling support node receiving a routing area update completion message;
   the controlling support node responding to said receiving of the routing area update completion message by sending a mobile Internet protocol agent advertisement to the mobile system, the mobile Internet protocol agent advertisement being the next message after the routing area update completion message to be communicated between the mobile system and the controlling support node.

2. A method according to claim 1 in which the advertisement includes challenge/response and network access identifier extensions.

3. A method according to claim 1 in which the advertisement is sent on a traffic channel.

4. A method according to claim 1 in which a mobile Internet protocol movement detection algorithm detects a change of foreign agent of the mobile system.

5. A method according to claim 4 in which on detection of a change of foreign agent, said mobile system is registered by mobile internet protocol registration.

6. A method according to claim 1 in which the former and new routing areas are within the same or different support networks, and the advertisement is sent after successful sending and receipt of routing area update request, acceptance and completion messages.

7. A method according to claim 1 in which the former and new routing areas are within different radio network controllers and the advertisement is sent after successful sending and receipt of radio network controller relocation request and completion messages.

* * * * *